United States Patent [19]

Moormann et al.

[11] Patent Number: 5,653,545
[45] Date of Patent: Aug. 5, 1997

[54] BALL-AND-SOCKET JOINT FOR MOTOR VEHICLES

[75] Inventors: Franz-Josef Moormann, Damme; Reinhard Buhl, Bohmte, both of Germany

[73] Assignee: Lemförder Metallwaren AG, Lemförde, Germany

[21] Appl. No.: 355,054

[22] Filed: Dec. 13, 1994

[30] Foreign Application Priority Data

Dec. 24, 1993 [DE] Germany ............ 43 44 628.0-12

[51] Int. Cl.⁶ .................. F16C 11/06; B62D 7/16
[52] U.S. Cl. .................. 403/50; 403/133; 277/212 FB
[58] Field of Search ............ 403/133, 50, 51; 277/212 FB

[56] References Cited

U.S. PATENT DOCUMENTS

| | | | |
|---|---|---|---|
| 3,013,828 | 12/1961 | Kleinschmidt | 403/133 |
| 3,807,195 | 4/1974 | Faulbecker | 277/212 FB |
| 3,901,518 | 8/1975 | Uchida | 277/212 FB |
| 4,714,368 | 12/1987 | Sawada et al. | 403/133 X |
| 4,856,795 | 8/1989 | DeLano et al. | 277/212 FB |
| 5,066,159 | 11/1991 | Urbach | 403/134 |
| 5,395,176 | 3/1995 | Zivkovic | 403/133 X |

FOREIGN PATENT DOCUMENTS

| | | | |
|---|---|---|---|
| 1625932 | 1/1970 | Germany | 277/212 FB |
| 3409989C1 | 9/1985 | Germany . | |

*Primary Examiner*—Anthony Knight
*Attorney, Agent, or Firm*—McGlew and Tuttle

[57] ABSTRACT

The present invention pertains to a ball-and-socket joint for motor vehicles, in which a joint ball, provided at the end of a pin, is inserted, with a bearing shell surrounding the joint ball, into a pot-shaped housing and is held by a closing ring. The closing ring can be connected to the open housing edge. One end of a gasket is adhesively connected, preferably by vulcanization, to the cylindrical inner jacket surface as well as to an adjoining area of the outer surface of the closing ring, which area extends at right angles to the inner jacket surface.

8 Claims, 2 Drawing Sheets

BALL-AND-SOCKET JOINT FOR MOTOR VEHICLES

FIELD OF THE INVENTION

The present invention pertains to a ball-and-socket joint for motor vehicles in which a joint ball provided at the end of a pin is inserted, with a bearing shell surrounding the joint ball, into a pot-shaped housing and the joint ball is held by a closing ring, which can be connected to an open edge of the housing. The closing ring surrounds the pin and has an internal diameter which is smaller than the ball diameter. The closing ring is connected to one end of a gasket made of an elastic material, whose other end is in sealing contact with the pin.

BACKGROUND OF THE INVENTION

According to the prior art German publication DE 34,09, 989 C1, FIG. 5, or U.S. Pat. No. 5,066,159, ball-and-socket joints of this special design are closed by rolling in a beaded edge on the open side of the pot-shaped housing, after the joint ball with the bearing shell has been inserted into the housing through the open side of the housing. It has also been known that a closing ring, whose internal diameter is smaller than the equator of the joint ball, but is larger than the pin on the joint ball, can be pushed over the pin and can be fastened by rolling in a beaded edge on the open side of the housing, so that the bearing shell is supported against this closing ring in an area extending radially within a projection of the equator. The gasket is fastened with one of its ends either in a groove provided on the outside on the edge of the housing or on the inside on the edge of the housing, and it is possibly secured by an additional retaining ring. It has also been known from the above-mentioned U.S. Pat. No. 5,066,159 that such a retaining ring is embedded in the elastic material of the gasket on the housing-side end of the gasket during the preparation of the gasket, as a result of which a certain axial elasticity, which is frequently undesirable, is obtained between the beaded edge of the housing and the bearing shell. In this relatively expensive prior-art arrangement, the gasket is easily damaged in its hose part when the pin with the joint ball is deflected into extreme deflection positions.

SUMMARY AND OBJECTS OF THE INVENTION

The object of the present invention is to find an inexpensive solution to the connection of a closing ring to the gasket in a ball-and-socket joint of the above-described class, which facilitates the assembly of the ball-and-socket joint and does not lead to damage to the gasket even at extreme deflection angles.

According to the invention, a ball-and-socket joint for motor vehicles is provided, in which a joint ball provided at the end of a pin is inserted with a bearing shell surrounding the joint ball into a pot-shaped housing. The joint ball is held by a closing ring which surrounds the pin. The closing ring can be connected to the open edge of the housing by a connection means. The closing ring has an internal diameter which is smaller than the ball diameter. The closing ring is connected to one end of a gasket made of an elastic material. The other end of the gasket is in sealing contact with the pin. The closing ring is in direct contact with the bearing shell on the inside of the bearing shell. The closing ring and the gasket are firmly connected to one another on the outer surface.

The gasket and a cylindrical inner jacket surface of the closing ring, as well as an adjoining area of the outer surface of the closing ring, which outer surface extends at right angles to the inner jacket surface, are preferably connected to one another by vulcanization.

The direct contact between the closing ring and the housing is maintained in this design, so that a firm housing closure is formed both radially and axially. The connection means creates this firm axial and radial housing closure with respective axial and radial forces. An axial elasticity can be achieved by a close fit and the axial force between the inner surface of the closing ring and a support surface on the bearing shell. The axial elasticity can be exactly defined by the closeness of the fit and an amount of the axial force from the connection means. The housing and the closing ring are formed, in the known manner, of metal. The closing ring is connected by vulcanization to the end of the gasket made of rubber or the like only on the annular inner jacket surface and in an area of the outer surface adjoining same, which area extends radially within the projection of the equator of the ball-and-socket joint. The connection can be prepared at low cost, and it facilitates the assembly of the joint as well as the mounting of the joint in a motor vehicle chassis.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
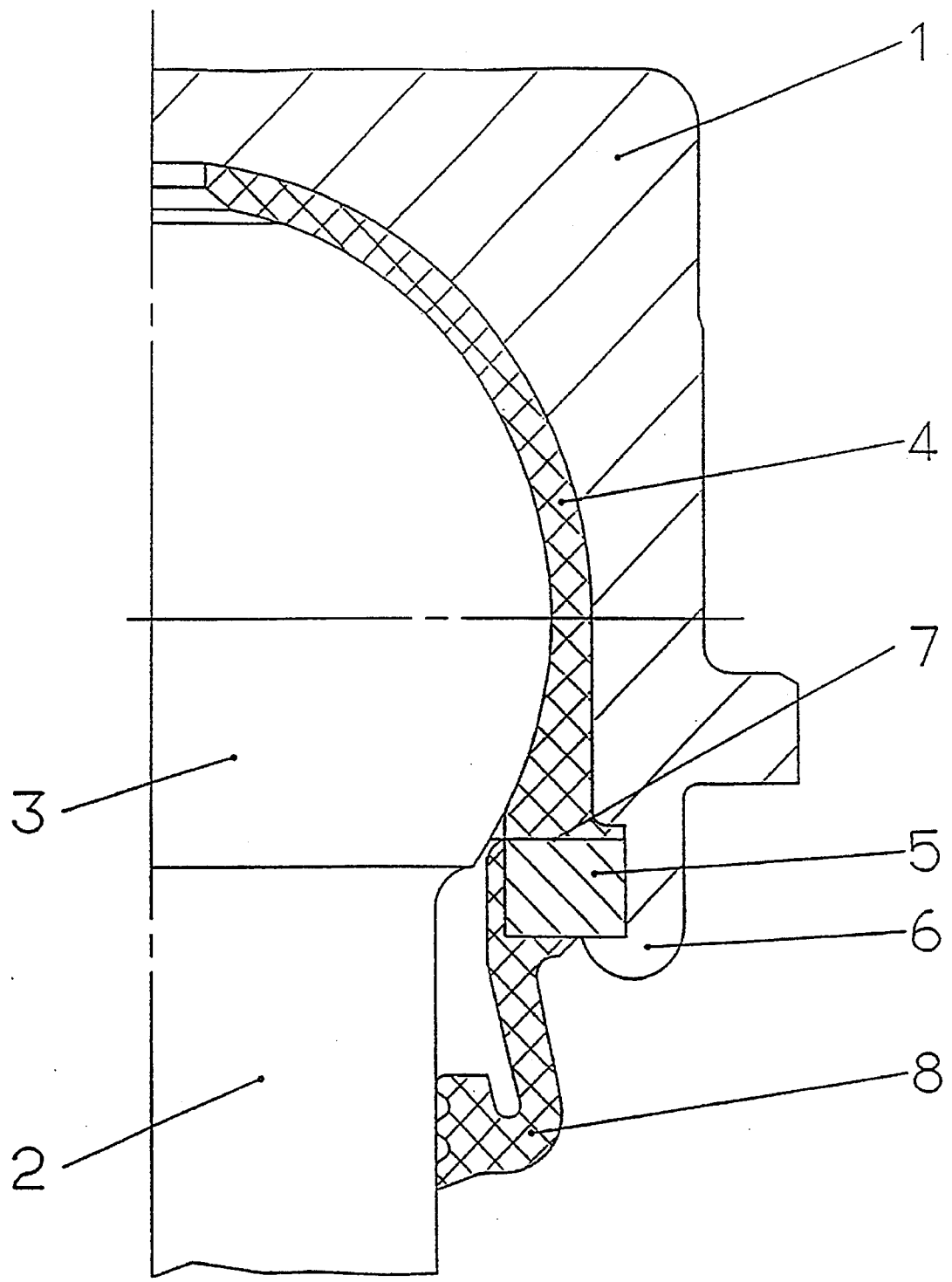
FIG. 1 is a one-sided sectional view taken through a ball-and-socket joint in a plane passing through the axis of the pin.
Figure 2:
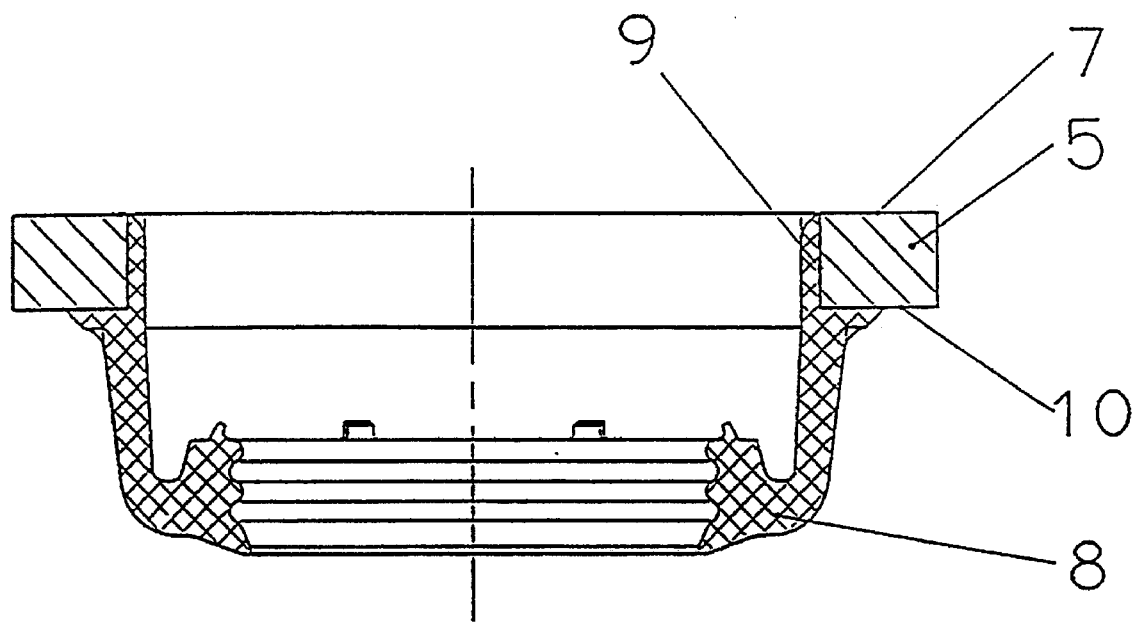
FIG. 2 is a sectional view corresponding to FIG. 1 through the closing ring and the gasket.

The housing 1 of the ball-and-socket joint has a pot-shaped design, and has only one open housing side. The joint ball 3 provided at one end of a pin 2 is inserted with a bearing shell 4 into the open housing side. The housing 1 and the pin 2 with the joint ball 3 preferably consist of metal. The bearing shell 4 consists of plastic, preferably a polyoxymethylene (POM).

After the joint ball 3 and the bearing shell 4 have been inserted into the housing 1, a closing ring 5 is inserted into the open side of the housing 1, and the closing ring 5 is closed or locked to the housing by a connection means formed by rolling in a beaded edge 6. The internal diameter of the closing ring 5 is smaller than the diameter of the joint ball 3, so that the joint ball 3 can no longer be pulled out of the housing 1. Close fit is provided between the radially extending inner axial surface 7 and an axial support surface of the bearing shell 4 directed in the same direction in the exemplary embodiment to achieve a limited axial elasticity. A gasket 8 is connected by vulcanization to the inner jacket surface 9 of the closing ring 5 and to an adjoining area of the outer surface 10 of the closing ring 5. The connection between the closing ring 5 and the gasket 8 on the axial surface 10 of the closing ring 5 is located within the beaded edge 6 after the joint housing 1 has been closed, so that the direct contact between the closing ring 5 and the beaded edge 6 is preserved. In the area of the inner jacket surface 9 of the closing ring 5, the material of the gasket 8 forms a stop or means pad for the pin 2 at the maximum deflection positions of the pin 2 against the housing 1, so that the hose area of the gasket 8 is not damaged even in the case of frequent extremely deflected positions. The outer end of the gasket 8 may have the design shown in the two drawing figures or it may be adapted to other, specific conditions.

While a specific embodiment of the invention has been shown and described in detail to illustrate the application of the principles of the invention, it will be understood that the invention may be embodied otherwise without departing from such principles.

What is claimed is:

1. A ball joint comprising:

a housing defining a cavity, said cavity opening outside of said housing through an open housing side of said housing;

a pin having a joint ball at an end of said pin, said joint ball being insertable into said cavity of said housing, said pin having a longitudinal axis;

a bearing shell surrounding said joint ball and having an axial support surface substantially perpendicular to said longitudinal axis, said joint ball and said bearing shell being positioned in said cavity;

a closing ring surrounding said pin and connected to said open housing side of said housing, said closing ring having an internal diameter which is smaller than a diameter of said joint ball, said closing ring having an inner axial surface substantially perpendicular to said longitudinal axis and directly contacting said axial support surface of said bearing shell, said closing ring also having an outer most axial surface;

a gasket made of an elastic material, said gasket having one end connected to said closing ring and having another end in sealing contact with said pin, said closing ring and said gasket being fixed to one another on said outer most axial surface of said closing ring.

2. A joint in accordance with claim 1, wherein:

said closing ring is locked to said housing by a connection means in contact with an outer most radial portion of said axial outer most surface of said closing ring;

said gasket is fixed to an inner most radial portion of said outer most axial surface, said gasket being spaced from said connection means.

3. A joint in accordance with claim 1, wherein:

said gasket is also fixed to an inner radial surface of said closing ring by vulcanization.

4. A joint in accordance with claim 3, wherein:

a portion of said gasket fixed to said inner radial surface of said closing ring forms a stop means for blocking movement of said pin which would damage said gasket.

5. A joint in accordance with claim 1, wherein:

said gasket is connected to said closing ring by vulcanization;

said housing is formed of metal;

said closing ring is formed of metal.

6. A joint in accordance with claim 1, wherein:

said closing ring and said bearing shell are shaped and positioned to have said inner axial surface of said closing ring and said axial support surface of said bearing shell to be substantially in full and sole contact with each other.

7. A joint in accordance with claim 6, wherein:

said closing ring is locked to said housing by a connection means in contact with an outer radial portion of said axial outer most surface of said closing ring, said connection means applies an axial force to said closing ring which is directly and fully transmitted to said axial support surface of said bearing shell.

8. A joint in accordance with claim 7, wherein:

an axial elasticity of the joint is determined by a closeness of a fit between said axial support surface and said inner axial surface, said axial elasticity is also determined by an mount of said axial force.

* * * * *